United States Patent Office 3,776,922
Patented Dec. 4, 1973

3,776,922
INDOLE CARBOXALDEHYDES
Joseph William Epstein, 19 Briarwood Ave., Monroe, N.Y. 10950, and Leon Goldman, 126 Grandview Ave., Nanuet, N.Y. 10954
No Drawing. Filed Mar. 24, 1972, Ser. No. 237,976
Int. Cl. C07d 27/54
U.S. Cl. 260—326.5 B
3 Claims

ABSTRACT OF THE DISCLOSURE

This disclosure describes derivatives of 5-methoxy-indolecarboxaldehydes variously useful as antimicrobial agents, diuretics, central nervous system depressants, and central nervous system antidepressants.

BRIEF SUMMARY OF THE INVENTION

This invention relates to new organic compounds and, more particularly, is concerned with novel derivatives of 5-methoxyindolecarboxaldehydes which may be represented by the following structural formulae:

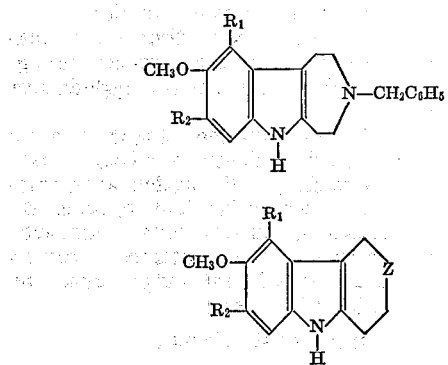

wherein $R_1$ is hydrogen or formyl and $R_2$ is hydrogen or formyl with the proviso that $R_1$ and $R_2$ may not be the same; and Z is divalent sulfur, ethylene, or N-methylimino.

DETAILED DESCRIPTION OF THE INVENTION

The novel compounds of the present invention (except where Z is ethylene or divalent sulfur) form useful pharmaceutically acceptable acid-addition salts with a variety of non-toxic organic and inorganic salt-forming reagents. Thus, acid-addition salts, formed by admixture of the organic free base with one or two equivalents of an acid in a suitable solvent, are formed with acids as acetic, ascorbic, citric, gluconic, hydrochloric, hydrobromic, lactic, sulfuric, phosphoric, tartaric, and the like. Although the novel compounds of the present invention may be used as such, they may also be administered in the form of their non-toxic acid-addition salts. For purposes of this invention, the organic free bases (except where Z is ethylene or divalent sulfur) are equivalent to their non-toxic acid-addition salts.

The novel compounds of the present invention are generally obtainable as white to yellow crystalline materials having characteristic melting points and absorption spectra and which may be purified by recrystallization from common organic solvents. They are appreciably soluble in many organic solvents such as methanol, ethanol, acetone, chloroform, benzene, dioxane, dimethyl sulfoxide and N,N-dimethylformamide, but are relatively insoluble in water. The acid-addition salts of the organic free bases of this invention are, in general, crystalline solids relatively soluble in water, methanol and ethanol but relatively insoluble in non-polar organic solvents such as diethyl ether, benzene, toluene, and the like.

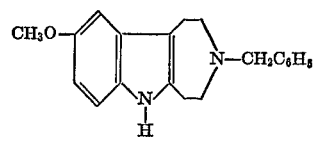

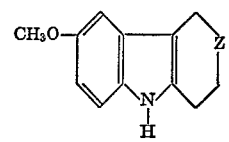

wherein Z is as hereinabove defined. This formylation is carried out by means of s-triazine in the presence of hydrochloric acid or trifluoroacetic acid under conditions well known to those skilled in the art.

Certain of the novel compounds of the present invention are useful as antifungal agents, and possess activity in vitro against fungal cultures capable of causing disease in man or animals. The activity, against a variety of standard laboratory microorganisms, is determined by the agar-dilution technique. In this assay, the compound to be tested is dissolved in dimethyl sulfoxide so that 10.0 mg. of test compound is contained per milliliter of solution. Observing sterile techniques, ten-fold serial dilutions are made of the test solution. Two-tenths ml., 0.1 ml. and 0.05 ml. amounts of the original solution and of each of the decimal dilutions are then added to and mixed with 20 ml. of warm sterile asparagine-meat extract agar capable of supporting growth of the test cultures. The standard sterile nutrient agar solutions containing the different dilutions of the test compound, along with suitable and comparable control dilutions containing no test compound, are then allowed to cool in Petri dishes thereby forming solid agar plates. The yeast-like test fungi are prepared for use by growing the Tryticase Soy broth overnight. These broth cultures are diluted tenfold in physiological saline at the time of use. The filamentous fungi are grown to maturity on slants of potato dextrose agar. Spores and mycelia are harvested by washing the growth from the slants with sterile physiological saline solution. Using the Steers Replicator a standardized amount of each of the resulting live suspensions is then, still employing sterile techniques, imprinted upon the surfaces of each of the gar plates and the resulting inoculated plates are then incubated. After an appropriate period of time, each of the inoculated areas on each of the plates is inspected visually and the extent, if any, of growth is noted. The minimal inhibitory concentration (mcg./ml.) is defined as the concentration of test compound causing essentially complete inhibition of any particular organism.

Certain of the novel compounds of the present invention are useful as antibacterial agents, and possess activity in vitro against gram-negative and gram-positive bacteria. This activity, against a variety of standard laboratory microorganisms, is determined by the agar-dilution technique. In this assay, the compound to be tested is dissolved in dimethyl sulfoxide so that 10.0 mg. of test compound is contained per milliliter of solution. Observing sterile techniques, tenfold serial dilutions are made of the test solution. Two-tenths ml., 0.1 ml. and 0.05 ml. amounts of the orignal solution and of each of the decimal dilutions are then added to and mixed with 20 ml. of warm sterile Trypticase-Soy agar capable of supporting growth of the test cultures. The sterile nutrient agar solutions containing the different dilutions of the test compound, along with suitable and comparable control dilutions containing no test compound, are then allowed to cool in Petri dishes thereby forming solid agar plates. The test organisms are prepared for use by growing in Trypticase Soy broth overnight. Each broth culture is diluted tenfold with physiological saline solution. Using the Steers Replicator a standardized amount of the resulting live suspensions is then, still employing sterile techniques, imprinted upon the surfaces of each of the agar plates and the resulting inoculated plates are then incubated. After an appropriate period of time, each of the inoculated areas on each of the plates is inspected visually and the extent, if any, of growth is noted. The minimal inhibitory concentration (meg./ml.) is defined as the concentration of test compound causing essentially complete inhibition of any particular organism.

In a representative operation, the minimal inhibitory concentration of the compounds of Table I against standard laboratory microorganisms, as determined in the above-described assays, are set forth in Table I.

TABLE II

Compound:             $MDD_{50}$ in mg./kg. of body weight

3 - benzyl - 1,2,3,4,5,6 - hexahydro - 9 - methoxyazepino[4,5-b]indole-10-carboxaldehyde _____ 49

The anti-depressant properties of certain of the novel compounds of the present invention were determined by measuring their ability to counteract a depression induced in animals by the administration of tetrabenazine hexamate. Graded doses of the active compounds of this invention are administered to groups of 5 mice each, and this is followed by administering a dose of tetrabenazine which is known to markedly depress the exploratory behavior of normal mice. The anti-depressant treated groups show normal exploratory behavior, while the control groups, and groups treated with an ineffective anti-depressant agent, do not show normal exploratory behavior, but show the well known profound depression induced

TABLE I

| Compound | Minimal inhibitory conc. (mcg./ml.) | | | | | | |
|---|---|---|---|---|---|---|---|
| | (1) | (2) | (3) | (4) | (5) | (6) | (7) |
| Fungal cultures: | | | | | | | |
| *Candida albicans* E 83 | | | | | | | |
| *Cryptococcus neoformans* E 138 | | | | | | | 250 |
| *Microsporum canis* ATCC 10214 | 25 | | | 10 | 1 | | 25 |
| *Microsporum gypseum* ATCC 14683 | 25 | | | 10 | 50 | | 25 |
| *Phialophthora jeanselmei* E 16 | | | | | | | |
| *Trichophyton tonsurans* NIH 662 | 50 | | | 5 | 50 | | 25 |
| *Trichophyton mentagrophytes* E 11 | 50 | | 250 | 10 | 100 | | 25 |
| *Trichophyton rubrum* E 97 | 50 | | | 10 | | | 25 |
| Bacterial cultures: | | | | | | | |
| *Mycobacterium smegmatis* ATCC 606 | | 62 | | 62 | | 250 | 250 |
| *Staphylococcus aureus* Rose ATCC 14154 | | 250 | | 62 | 62 | | |
| *Streptococcus pyogenes* C 203 | 250 | 250 | | 62 | 62 | | |
| *Klebsiella pneumoniae* AD | | 250 | | | | | |
| *Proteus vulgaris* ATCC 9484 | | 250 | | 250 | | | |
| *Salmonella typhosa* ATCC 6539 | | 250 | | | | | |

1 3-benzyl-1,2,3,4,5,6-hexahydro-9-methoxyazepino[4,5-b]indole-8-carboxaldehyde.
2 3-benzyl-1,2,3,4,5,6-hexahydro-9-methoxyazepino[4,5-b]indole-10-carboxaldehyde.
3 1,3,4,5-tetrahydro-8-methoxythiopyrano[4,3-b]indole-9-carboxaldehyde.
4 5,6,7,8,9,10-hexahydro-2-methoxycyclohept[b]indole-1-carboxaldehyde.
5 trans-5,6,7,8,9,10-hexahydro-2-methoxy-3-(2-nitrovinyl)cyclohept[b]-indole.
6 2,3,4,5-tetrahydro-8-methoxy-2-methyl-1H-pyrido[4,3-b]indole-9-carboxaldehyde.
7 1,2-cycloheptanedione (p-methoxyphenyl)hydrazone.

Certain of the novel compounds of the present invention are valuable central nervous system depressants of low toxicity and were shown to possess CNS depressant activity as determined by animal experiments as follows. The compounds are administered intraperitoneally to groups of five mice at a dose level of 50 mg./kg. of body weight. Then, 5 minute counts of motor activity for each group of mice are made by means of an actophotometer which is a photoelectric device consisting essentially of a circular cage holding six lights directed respectively at six photoelectric cells spaced evenly around the perimeter of the cage. A single count is recorded automatically each time a mouse breaks a light beam, and the total of such counts during a given interval is a measurement of the total motor activity of the mice in the actophotometer. Counts of 250 or less are considered to indicate a significant reduction (more than two standard deviations) of motor activity. Those compounds that appear to reduce motor activity by 50% or more are administered to additional groups of five mice at graded doses and tested similarly. The motor depressant dose ($MDD_{50}$) which causes a 50% reduction in motor activity is then estimated from the dose response curve. In a representative operation, and merely by way of illustration, a typical compound of this invention was shown to reduce locomotor activity as set forth in Table II.

by tetrabenazine. When tested by this procedure at the intraperitoneal doses indicated, the following compounds of this invention showed anti-depressant activity as described in Table III.

TABLE III

Compound:         Tetrabenazine reversal mg./kg. intraperitoneally 5,6,7,8,9,10 - hexahydro - 2 - methoxycyclohept[b]-indole-1-carboxaldehyde _____ 25

1,2-cycloheptanedione (p-methoxyphenyl)-hydrazone _____ 25

Certain of the novel compounds of the present invention were shown to possess diuretic properties as determined by animal experiments as follows. Mature male rats weighing between 180 and 300 grams are allowed a normal food and fluid intake prior to testing. The single oral administration of the test compound is given in 0.5 milliliter of 2 percent aqueous starch suspension. Four cages (2 rats per cage) serve as controls for each measurement. Control animals receive only the starch suspension. After administration, the test animals are placed in metabolism cages. Observations of the amount of urine excreted are made after 5 hours and after 24 hours. Sodium and potassium concentrations in the urine are determined by flame photometry. Chloride is determined either spectrophotometrically or by electrometric titration with a Cotlove Chloridometer. The results are summarized in Table IV for the 0–5 hour and 0–24 hour test period. A positive number is an increase and a negative number is a decrease.

cate, eluting with chloroform and chloroform/acetone, gives 2.35 g. of orange crystals, M.P. 170° C.–196° C. Recrystallization from ethanol gives 1.05 g. of 1,3,4,5-tetrahydro-8-methoxythiopyrano[4,3 - b]indole-9-carboxaldehyde as orange crystals, M.P. 191° C.–198° C.

TABLE IV

| Compound | Dosage, mg./rat | Number of rats | Percent change from control | | | | | | Urine volume | |
| --- | --- | --- | --- | --- | --- | --- | --- | --- | --- | --- |
| | | | Na | | K | | Cl | | | |
| | | | 0–5 hrs. | 0–24 hrs. | 0–5 hrs. | 0–24 hrs. | 0–5 hrs. | 0–24 hrs. | 0–5 hrs. | 0–24 hrs. |
| 2,3,4,5-tetrahydro-8-methoxy-2-methyl-1H-pyrido[4,3-b]-indole-7-carboxaldehyde | 25 | 4 | 16.6 | −8.0 | −3.7 | −7.2 | −2.7 | 0.9 | 85.7 | −13.7 |
| 1,2-cycloheptanedione (p-methoxyphenyl)hydrazone | 25 | 4 | 50 | 70 | 33 | 36 | 46 | 81 | 15 | 49 |

When mixed with suitable excipients or diluents, the compounds of this invention can be prepared as pills, capsules, tablets, powders, solutions, suspensions, and the like for unit dosage and to simplify administration.

The invention will be described in greater detail in conjunction with the following specific examples.

Example 1.—Preparation of 3-benzyl-1,2,3,4,5,6-hexahydro-9 - methoxyazepino[4,5-b]indole - 8 - carboxaldehyde and 3 - benzyl-1,2,3,4,5,6-hexahydro-9-methoxyazepino[4,5-b]indole-10-carboxaldehyde To a stirred solution of 12.24 g. of 3-benzyl-1,2,3,4,5,6-hexahydro-9-methoxyazepino[4,5-b]indole [J. B. Hester, A. H. Teng, H. H. Keasling and W. Veldkamp, J. Med. Chem., 11, 101 (1968)] in 100 ml. of trifluoroacetic acid, cooled in an ice bath, is added 6.48 g. of s-triazine over a 10 minute period. Stirring is continued for an additional 10 minutes at room temperature. The solution is poured into 800 ml. of water and then made basic with ammonium hydroxide. The resulting suspension is extracted with dichloromethane, the extract is dried over sodium sulfate and the solvent is removed under reduced pressure to yield 15.7 g. of brown gum. This is triturated with methanol and the mixture is filtered to yield 2.89 g. of the 10-carboxaldehyde. M.P. 165° C.–168° C. The filtrate is subjected to partition chromatography on 2640 g. of diatomaceous using a heptane/methanol solvent system and monitoring the effluent at 240 nm. to yield 1.54 g. of 3-benzyl-1,2,3,4,5,6-hexahydro - 9 - methoxyazepino[4,5-b]indole-8-carboxaldehyde from the third HBV as yellow plates, M.P. 205°–207° C. Recrystallization from ethanol gives 1.45 g. of yellow plates, M.P. 207°–208° C. From the sixth through the ninth HBV there is obtained an additional 4.03 g. of 3-benzyl-1,2,3,4,5,6-hexahydro-9-methoxyazepino[4,5-b]indole-10-carboxaldehyde as yellow prisms, M.P. 155° C.–166° C. The two samples of the 10-carboxaldehyde are combined and are recrystallized from ethanol to yield 5.00 g. of 3-benzyl-1,2,3,4,5,6-hexahydro-9-methoxyazepino[4,5-b]indole - 10 - carboxaldehyde as yellow prisms, M.P. 170° C.–172° C.

Example 2.—Preparation of 1,3,4,5-tetrahydro-8-methoxythiopyrano[3,4-b]indole-9-carboxaldehyde To a stirred solution of 5.50 g. of 1,3,4,5-tetrahydro-8-methoxythiopyrano[4,3-b]indole [T. E. Young, C. J. Ohnmacht, and C. R. Hamel, J. Org. Chem. 32, 3622 (1967)] in 50 ml. of trifluoroacetic acid is added 4.05 g. of s-triazine over a 30 minute period at room temperature after which the solution is poured into 500 ml. of water. The resultant mixture which contains microcrystals is made strongly basic with concentrated ammonium hydroxide and extracted with chloroform, and the extract is dried over sodium sulfate. Evaporation of the solution under reduced pressure gives 5.84 g. of orange solid. Chromatography of the crude material on magnesium sili- Example 3.—Preparation of 5,6,7,8,9,10 - hexahydro-2-methoxycyclohept[b]indole-1-carboxaldehyde and 5,6,7,8,9,10-hexahydro - 2 - methoxycyclohept[b]indole-3-carboxaldehyde To a stirred solution of 7.50 g. of 5,6,7,8,9,10-hexahydro-2-methoxycyclohept[b]indole [L.M. Rice, E. Hertz, and M. E. Freed, J. Med. Chem., 7, 313 (1964)] in 50 ml. of trifluoroacetic acid at room temperature is added 2.00 g. of s-triazine over a 10 minute period. The solution is then poured into 500 ml. of water and the mixture is made strongly basic with 75 ml. of 10 N sodium hydroxide, followed by concentrated ammonium hydroxide. The resulting suspension is extracted with dichloromethane and the extract is dried over magnesium sulfate. The solution is evaporated under reduced pressure to yield 7.79 g. of a dark brown solid which is then subjected to partition chromatography on 2200 g. of diatomaceous earth using a heptane/methanol solvent system and monitoring the effluent at 240 nm. From the third HBV there is obtained 2.53 g. of a brown gum which is then chromatographed on 100 g. of magnesium silicate using hexane/acetone (3:1) with four 50-ml. cuts being collected. The fourth cut is evaporated in an air stream to yield 0.216 g. of yellow crystals, M.P. 160° C.–175° C. Recrystallization from hexane/acetone gives 0.045 g. of 5,6,7,8,9,10-hexahydro-2-methoxycyclohept[b]indole - 3 - carboxaldehyde as yellow needles, M.P. 239° C.–240° C. From the fifth and sixth HBV there are obtained 1.86 g. of yellow crystals, M.P. 125° C.–130° C., which on recrystallization from hexane/acetone gives 0.342 g. of 5,6,7,8,9,10-hexahydro-2-methoxycyclohept[b]indole - 1 - carboxaldehyde as yellow prisms, M.P. 1733°–134° C.

Example 4.—Preparation of 5,6,7,8,9,10-hexahydro-2-methoxycyclohept[b]indole-1-carboxaldehyde and 5,6,7,8,9,10-hexahydro - 2 - methoxycyclohept[b]indole-3-carboxaldehyde A solution of 12.9 g. of 5,6,7,8,9,10-hexahydro-2-methoxycyclohept[b]indole and 7.50 g. of s-triazine in 250 ml. of chloroform and 50 ml. of ether is saturated with anhydrous hydrogen chloride. The brick red suspension is stirred at room temperature for 1½ hours at which time the reaction mixture is poured into 100 ml. of 10% ammonium hydroxide. This mixture is extracted with 150 ml. of chloroform, the extract is dried over sodium sulfate and then is applied to a 450 g. magnesium silicate column packed in hexane, and is eluted with 500 ml. of hexane/acetone (3:2) and 1000 ml. of hexane/acetone (1:1). Four 250-ml. fractions of yellow eluate are collected and are evaporated in an air stream to yield four crops of yellow crystals weighing 0.700 g., 1.25 g., 4.42 g. and 2.53 g., respectively. The latter two fractions are combined and are recrystallized from acetone/hexane to yield 2.75 g. of 5,6,7,8,9,10 - hexahydro-2-methoxycyclohept[b]indole-3-carboxaldehyde as yellow needles, M.P. 240° C.–242° C. The mother liquor from the above recrystallization is evaporated to yield 2.80 g. of yellow crystals which are subjected to partition chromatography on 1100 g. of diatomaceous earth using a heptane/methanol solvent system and monitoring the effluent at 240 nm. From the third HBV there is obtained an additional 0.580 g. of the 3-carboxaldehyde as yellow crystals, M.P. 233°–238° C. From the seventh HBV there is obtained 1.49 g. of greenish yellow crystals. These are dissolved in dichloromethane and filtered through a column of magnesium silicate. Evaporation of the solution in a stream of nitrogen gives 1.01 g. of greenish yellow crystals, M.P. 130–133° C. which on recrystallization from hexane/acetone gives 0.694 g. of 5,6,7,8,9,10 - hexahydro-2-methoxycyclohept[b]indole-1-carboxaldehyde as greenish yellow crystals, M.P. 133° C.–134° C.

Example 5.—Preparation of trans-5,6,7,8,9,10-hexahydro-2-methoxy-3-(2-nitrovinyl)cyclohept[b]indole A solution of 2.75 g. of 5,6,7,8,9,10-hexahydro-2-methoxycyclohept[b]indole-3-carboxaldehyde and 0.5 g. of ammonium acetate in 25 ml. of nitromethane is refluxed for four hours. Filtration of the cooled solution gives 2.55 g. of red needles, M.P. 178° C.–182° C. Recrystallization from ethanal gives 2.15 g. of trans-5,6,7,8,9,10-hexahydro-2-methoxy-3-(2-nitrovinyl)cyclohept[b]indole as red needles, M.P. 180° C.–183° C.

Example 6.—Preparation of 2,3,4,5-tetrahydro-8-methoxy-2-methyl-1H-pyrido[4,3-b]indole To a solution of 13.8 g. of p-methoxyphenylhydrazine in 210 ml. of N/1 ethanolic hydrogen chloride and 75 ml. of ethanol cooled in an ice bath, is added 10.1 g. of N-methyl-4-piperidone over a period of 5 minutes. The mixture is heated for 1 hour at 80° C. in a nitrogen atmosphere, cooled to room temperature and, after being allowed to stand for 16 hours, is filtered to yield 20.3 g. of 2,3,4,5 - tetrahydro - 8 - methoxy-2-methyl-1H-pyrido [4,3-b]indole hydrochloride as pale purple needles. This material is dissolved in 200 ml. of water and the solution is made basic with 4 g. of sodium hydroxide. Filtration of the mixture gives 12.2 g. of semicrystalline solid, M.P. 168° C.–171° C. Recrystallization from hexane/ethyl acetate gives 10.6 g. of 2,3,4,5-tetrahydro-8-methoxy-2-methyl-1H-pyrido[4,3-b]indole as pale pink needles, M.P. 170° C.–172° C.

Example 7.—Preparation of 2,3,4,5-tetrahydro-8-methoxy - 2 - methyl-1H-pyrido[4,3-b]indole-7-carboxaldehyde and 2,3,4,5-tetrahydro-8-methoxy-2-methyl-1H-pyrido[4,3-b]indole-9-carboxaldehyde A solution of 15.0 g. of 2,3,4,5-tetrahydro-8-methoxy-2-methyl-1H-pyrido[4,3-b]indole in 175 ml. of trifluoroacetic acid is cooled to 5° C. and 11.2 g. of s-triazine is added over a 10 minute period, with stirring. After being stirred for an additional ten minutes at room temperature the solution is poured into 1 l. of water. To this solution is added 500 ml. of chloroform and 250 ml. of 10 N sodium hydroxide and the mixture is stirred vigorously. The chloroform layer is washed with water, dried over sodium sulfate and evaporated under reduced pressure to yield 16.1 g. of dark amber glass. This material is subjected to partition chromatography on diatomaceous earth using a heptane/ethyl acetate/methanol/water (70:30: 17:4) solvent system and monitoring the effluent at 240 nm. to yield 0.518 g. of yellow needles, M.P. 202° C.–204° C. (insert at 180° C.) from the fifth HBV. Recrystallization from acetone gives 0.259 g. of 2,3,4,5-tetrahydro-8-methoxy-2-methyl-1H-pyrido[4,3-b]indole-7-carboxaldehyde as pale yellow needles, M.P. 209° C.–211° C. (insert at 180° C.). From the seventh HBV there is obtained 8.50 g. of 2,3,4,5-tetrahydro-8-methoxy-2-methyl-1H-pyrido[4,3-b]indole-9-carboxaldehyde as yellow needles, M.P. 166° C.–170° C. Recrystallization from acetone gives yellow needles, M.P. 173° C.–174° C.

Example 8.—Preparation of 1,2-cycloheptanedione-(p-methoxyphenyl)hydrazone

To a mixture of 47.6 g. of p-anisidine in 180 ml. of water containing 36 ml. of concentrated sulfuric acid and 350 g. of ice is added 26 g. of sodium nitrite in 100 ml. of water followed by a concentrated aqueous solution of 100 g. of sodium acetate. To the vigorously stirred mixture is added 40.0 g. of 2-hydroxymethylenecycloheptanone over a 5 minute period and stirring is continued for an additional ½ hour. A dark oil separates which then crystallizes. The orange-brown solid is removed by filtration, washed with water and then air dried. The yield of crude product is 59.0 g., M.P. 59° C.–61° C. Recrystallization from ethanol gives 50.9 g. of 1,2-cycloheptanedione (p-methoxyphenyl)hydrazone as orange prisms, M.P. 62° C.–64° C.

We claim:
1. Compounds of the formula:

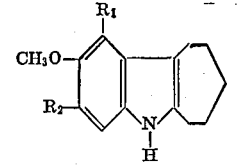

wherein $R_1$ and $R_2$ are each selected from the group consisting of hydrogen and formyl with the proviso that $R_1$ and $R_2$ are different.

2. The compound according to claim 1, wherein $R_1$ is formyl and $R_2$ is hydrogen; 5,6,7,8,9,10-hexahydro-2-methoxycyclohept[b]indole-1-carboxaldehyde.

3. The compound according to claim 1, wherein $R_1$ is hydrogen and $R_2$ is formyl; 5,6,7,8,9,10-hexahydro-2-methoxycyclohept[b]indole-3-carboxaldehyde.

References Cited
UNITED STATES PATENTS
3,652,588  3/1972  Hester _____ 260—326.3

JOSEPH A. NARCAVAGE, Primary Examiner

U.S. Cl. X.R.

260—296 A, 326.55 A, 569; 424—263, 274, 327

UNITED STATES PATENT OFFICE
CERTIFICATE OF CORRECTION

Patent No. 3,776,922          Dated December 4, 1973

Inventor(s) Joseph William Epstein and Leon Goldman

It is certified that error appears in the above-identified patent and that said Letters Patent are hereby corrected as shown below:

Column 1, line 6 insert -- assignors to American Cyanamid Company, Stamford, Conn. --.

Column 2, line 3 insert -- The novel compounds of the present invention may be readily prepared by formylation of compounds of the formulae: --.

Column 3, line 12 "(meg./ml.) should be -- (mcg./ml.) --.

Column 6, line 53 "1733°-134°C." should be -- 133°-134°C --.

Signed and sealed this 1st day of October 1974.

(SEAL)
Attest:

McCOY M. GIBSON JR.
Attesting Officer

C. MARSHALL DANN
Commissioner of Patents